United States Patent [19]
McCormack et al.

[11] Patent Number: 5,387,994
[45] Date of Patent: Feb. 7, 1995

[54] COMMUNICATIONS ADAPTER FOR CONVERTING WIRE-BASED COMMUNICATION TO WIRELESS COMMUNICATION

[75] Inventors: Michael D. McCormack, Robbinsdale; Kent C. Woodgate, Bloomington, both of Minn.

[73] Assignee: Thermo King Corporation, Minneapolis, Minn.

[21] Appl. No.: 195,496

[22] Filed: Feb. 14, 1994

[51] Int. Cl.[6] .......................................... H04B 10/00
[52] U.S. Cl. ................................ 359/159; 359/172; 340/825.72; 455/12.1
[58] Field of Search ............... 359/159, 163, 172, 175, 359/176; 375/3–4; 340/825.72, 854.7; 455/11.1, 12.1; 364/712–713; 439/628

[56] References Cited
U.S. PATENT DOCUMENTS
4,908,823  3/1990  Haagens et al. ................. 359/163

FOREIGN PATENT DOCUMENTS
0114985  8/1984  European Pat. Off. ........... 359/159
0258129  10/1988  Japan ............................. 359/159

Primary Examiner—Richard E. Chilcot, Jr.
Assistant Examiner—Kinfe-Michael Negash

[57] ABSTRACT

A communications adapter for converting a socket connector of communications apparatus from wire-based communication to wireless communication, with the socket connector having transmit and receive contacts, and a control contact which enables the socket connector only when a predetermined logic level is applied thereto. The communications adapter includes a plug connector having transmit, receive and control pins arranged to respectively engage the transmit, receive and control contacts of the socket connector, a light emitting diode, a timer having a trigger input and an output, and a photo detector. The light emitting diode and photo detector are respectively connected to the transmit and receive pins which engage the transmit and receive contacts of the socket connector, and the output of the timer is connected to the control pin of the plug connector which engages the control contact of the socket connector. The photo detector is additionally connected to the trigger input of the timer. The timer provides a timed output signal at the timer output having the first predetermined logic level only in response to a predetermined signal applied to the trigger input by the photo detector. An input signal applied to the photo detector causes the photo detector to trigger the timer, enabling communications via the socket connector for the duration of the timed output signal.

14 Claims, 3 Drawing Sheets

COMMUNICATIONS ADAPTER FOR CONVERTING WIRE-BASED COMMUNICATION TO WIRELESS COMMUNICATION

TECHNICAL FIELD

The invention relates in general to communications apparatus, and more specifically to converting communications apparatus from wire-based communications to wireless communications.

BACKGROUND ART

Wire-based communications apparatus, such as a data logger, often have more than one communication port. For example, a data logger available from the assignee of the present application, identified as Data Management System DMS II D/S, includes first and second communication ports. The first communication port includes a socket connector for plug-in connection to a hand-held computer for down-loading information from the data logger to the computer. The second communication port is adapted for connection to apparatus which provides wireless communication between an over-the-road vehicle and a home base via satellite. The second communication port is enabled, until a plug connector is engaged with the socket connector of the first communication port, with the plug connector changing the logic level of a control terminal of the socket connector which causes a multiplexer to route data to the first communication port instead of to the second communication port, as long as the plug connector is engaged with the socket connector. When the plug connector is disconnected from the socket connector, the multiplexer again routes communications through the second communication port.

The above mentioned data logger is often physically mounted on a refrigeration unit, with the data logger periodically recording information concerning the operation of the associated refrigeration unit. Such refrigeration units are often associated with refrigerated containers which are usually stacked upon each other to a predetermined height, which may reach as high as 23 feet (7 meters). It is thus very difficult for an operator who wishes to down load data to a hand held computer to make the necessary plug-in connection, requiring ladders or other means of elevation.

It would thus be desirable, and it is an object of the present invention, to be able to easily convert a socket connector dedicated to wire-based communication, to wireless communication, even when the socket connector has a control terminal which enables the communication port only when a plug connector is engaged therewith. It is further desirable, and it is another object of the invention, to be able to make the conversion of the socket connector to wireless communication, without continuously enabling the socket connector. In other words, it would be desirable to enable the socket connector only during actual wireless communication, returning communication to some other communication port when the wireless communication via the socket connector is not active.

SUMMARY OF THE INVENTION

Briefly, the present invention is a communications adapter for converting a socket connector of communications apparatus from wire-based communication to wireless communication. The socket connector includes transmit and receive contacts, and a control contact which enables the socket connector only when a first predetermined logic level is applied thereto.

The communications adapter includes a plug connector having transmit, receive and control pins arranged to engage the transmit, receive and control contacts of the socket connector, light emitting diode means connected to the transmit pin of the plug connector which engages the transmit contact of the socket connector, timer means having a trigger input and an output, and photo detector means. The output of the timer, which is connected to the control pin of the plug connector which engages the control contact of the socket connector, provides a timed output signal having the requisite first predetermined logic level in response to a signal applied to the trigger input, and otherwise provides a signal having a second logic level.

The photo detector means has an output connected to the trigger input of the timer means and also to the receive pin of the plug connector. An output signal from the photo detector means triggers the timer means in response to an input signal applied to the photo detector means, enabling communications via the socket connector for the duration of the timed output signal.

In an exemplary embodiment of the invention, the communications adapter is suitable for connection to a socket connector associated with a first communication port of data logger means having first and second alternatively selectable communication ports, for converting the socket connector from wire-based communication to wireless communication. The data logger means has multiplexer means which includes a data input, first and second data outputs respectively connected to a first contact of the socket connector and to the second communication port, a signal input connected to a second contact of the socket connector, and a select input connected to a third contact of the socket connector. The select contact has a default logic level which connects the data input of the multiplexer means to the second data output.

The communications adapter includes a plug connector having first, second and third pins which respectively engage the first, second and third contacts of the socket connector, light emitting diode means, timer means, and photo detector means. The light emitting diode means is connected to the first pin of the plug connector. The photo detector means has an output connected to the trigger input of the timer means and also to the second pin of the plug connector. The timer means, which has an output connected to the third pin of said plug connector, and a trigger input, provides a predetermined timed output signal in response to a signal applied to the trigger input.

The photo detector means triggers the timer means in response to an input signal applied to the photo detector means, with the timed output signal of the timer means providing a signal for the select input of the multiplexer means which causes the data input of the multiplexer means to be connected to the first data output of the multiplexer means for the duration of the timed output signal.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

The invention is particularly useful for use in data logging applications related to the monitoring of transport refrigeration units, such as straight trucks, tractor-trailer units, refrigerated containers, and the like, and it will thus be described in that environment. It will be understood, however, that the invention may be used with any communications apparatus for converting a socket connector used for wire-based communication to wireless communication.

Figure 1:
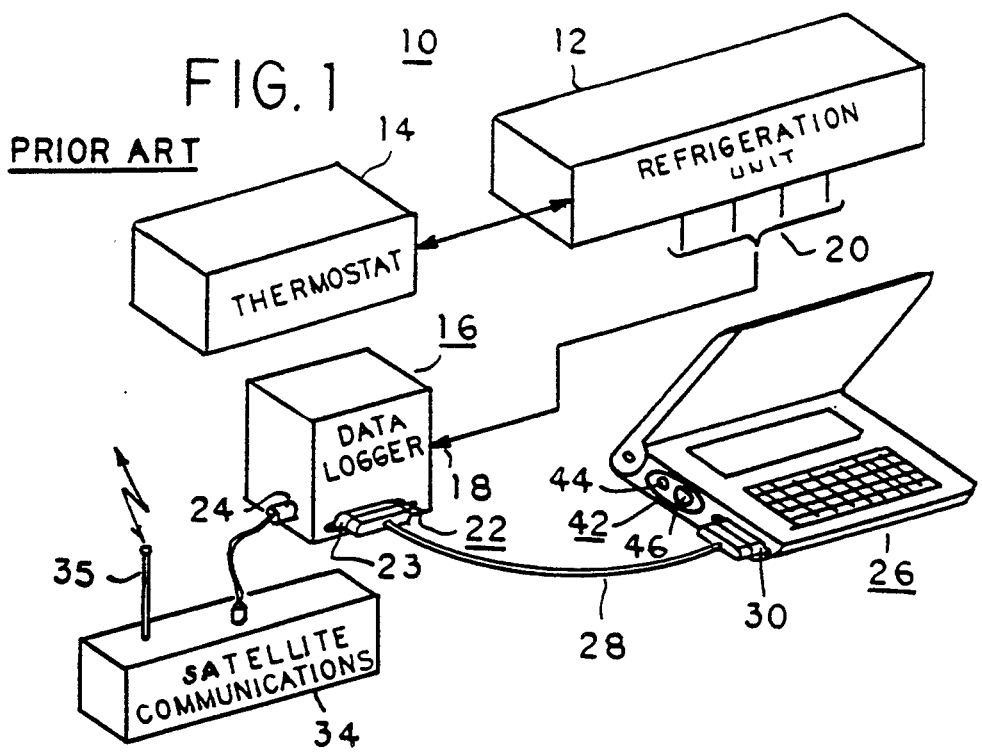
FIG. 1 illustrates a refrigeration system which includes associated data logger apparatus, with the data logger apparatus being arranged to alternatively download data into a computer via a cable, or to provide communications between an over-the-road refrigeration system and a home base via satellite, according to the teachings of the prior art.

Referring now to the drawings, and to FIG. 1 in particular, there is shown a prior art refrigeration system and associated data logging apparatus 10. Apparatus 10 includes a refrigeration unit 12, such as a transport refrigeration unit, controlled by a thermostat 14, and communications apparatus in the form of a data logger 16. Data logger 16 may be the hereinbefore mentioned Data Management System DMS-II D/S commercially available from Thermo King Corporation. Data logger 16 has a plurality of analog and digital inputs, shown generally at 18, for periodically recording data relative to the operation of refrigeration unit 12. If thermostat 14 has an output, this output may be connected to data logger 16. If thermostat 14 does not have an output, data logger 16 may be connected to sense predetermined parameters indicative of the operation of refrigeration unit 12 via a plurality of sensors, shown generally at 20. For example, the sensors may include one or more temperature sensors, such as return air and discharge air temperature sensors, an engine speed sensor, a humidity sensor, a refrigeration cycle identification sensor, and the like.

Data logger 16 has first and second communication ports 22 and 24, respectively. The first communication port 22, which has a socket connector 23, such as a type D socket connector, for example, is connectable to a hand held computer 26 when it is desired to download data stored in data logger 16 to a personal computer (PC), such as the hand held computer 26 illustrated. Computer 26 may be Hewlett Packard's HP95LX, or HP100LX, for example. Data logger apparatus 10 is wire-based, relative to the first communication port 22, as it is connected to computer 26 via a serial connector cable 28 which is connected to the socket connector 23 of data logger 16 and to a serial port 30 on computer 26.

The second communication port 24 is adapted for connection to a satellite communications apparatus 34 for mobile satellite service which serves the long distance refrigerated trucking industry. An antenna 35 is mounted on an associated vehicle, such as a truck or tractor of a tractor-trailer unit. A home base is thus able to track the location of the truck, as well as to continuously monitor predetermined parameters of a refrigerated load carried by the truck or trailer in an associated conditioned space. Satellite communications apparatus 34 is obtainable commercially from QualComm Inc. San Diego, Calif. 92121.

As will be described in detail relative to FIG. 3, the first communication port 22 has a control pin or terminal which has a first logic level, e.g., a logic one, when the associated socket connector 23 is not connected to serial connector cable 28, and a second logic level, e.g., logic zero, when socket connector 23 and computer 26 are connected to serial connector cable 28. The first logic level is a default level, connecting data logger 16 to the second communication port 24, except when serial connector cable 28 and associated computer 26 are plugged into socket connector 23. Once serial connector cable 28 and associated computer are plugged into socket connector 23, data logger 16 is connected to the first communication port.

Figure 2:
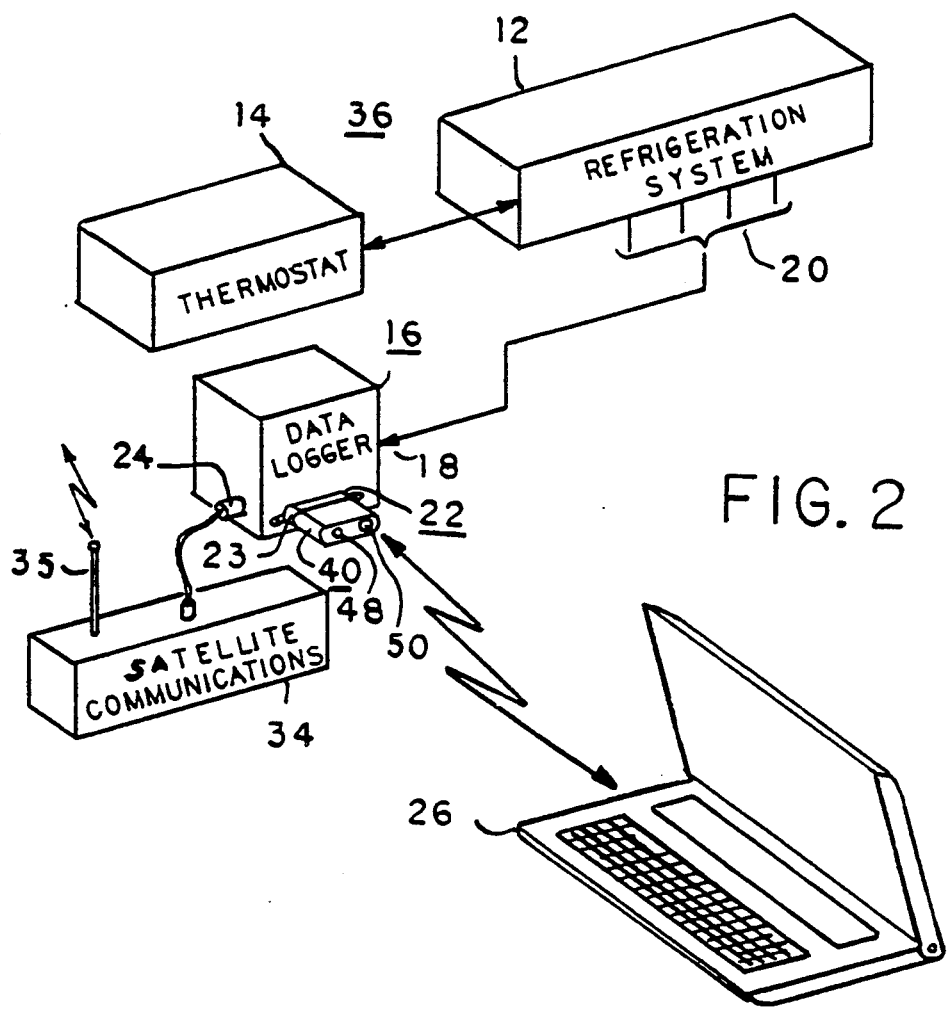
FIG. 2 illustrates a modification of the apparatus shown in FIG. 1 according to the teachings of the invention, wherein a communications adapter is provided on the data logger, which converts the socket connector from wire-based communication to wireless communication, enabling data loggers disposed in difficult to reach locations to be easily accessed by a computer.

As hereinbefore stated, data logger 16 and socket connector 23 may not be easily accessible to one desiring to download data into computer 26. The present invention solves this problem, as illustrated in FIG. 2. FIG. 2 illustrates data logging apparatus 36 which includes a communications adapter 40 constructed according to the teachings of the invention. Communications adapter 40 is plugged into socket connector 23 of the first communication port 22, and it instantly converts the first communication port 22 from wire-based communications to wireless communications.

As illustrated in FIG. 1, computer 26, such as the hereinbefore mentioned computers available from Hewlett Packard, includes a wireless communication port 42 having a receiver 44 and a transmitter 46 which respectively detect and transmit electromagnetic radiation in the invisible infrared spectrum. Communications adapter 40 has a receiver 48 and a transmitter 50 which also respectively detect and transmit electromagnetic radiation in the infrared spectrum. In addition, as will be explained in detail relative to FIG. 4, the communications adapter 40 includes means which prevents the physical act of coupling the communications adapter 40 with socket connector 23 from permanently connecting data logger 16 to the first communication port 22. Data logging apparatus 36 defaults to communication with the second communication port 24, switching to the first communication port 22 only during actual wireless communication with computer 26.

Figure 3:
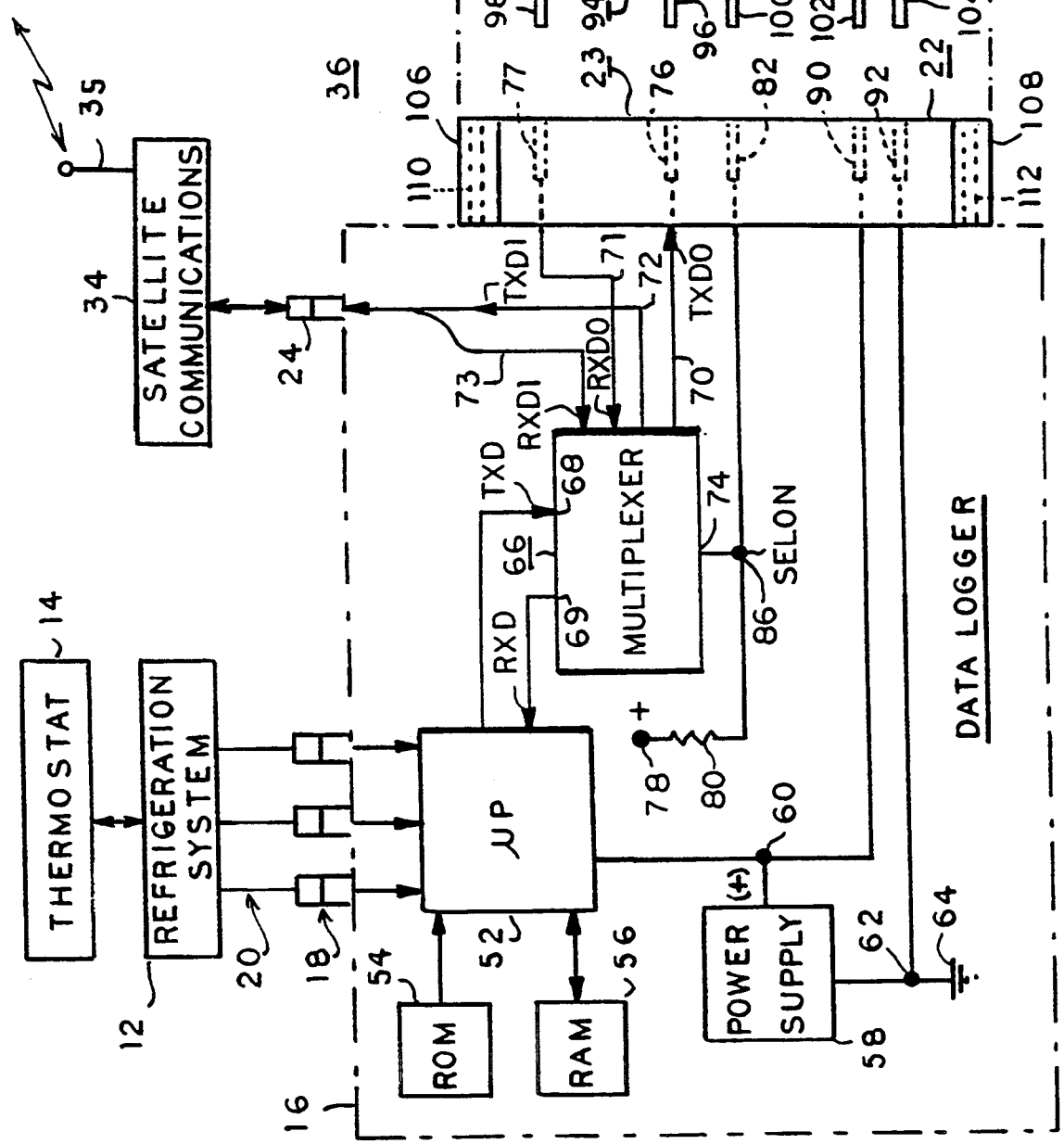
FIG. 3 is a partially schematic and partially diagrammatic representation of the apparatus shown in FIG. 2, illustrating the data logger in detail.

Data logging apparatus 36 is shown in greater detail in FIG. 3. Data logger 16 includes a microprocessor 52 which includes a read-only memory (ROM) 54 and a random-access memory (RAM) 56. Data applied to input terminals 18 via sensors 20 is periodically read in response to a real-time clock (not shown), and stored in RAM 56 according to an applications program stored in ROM 54. Electrical power for the operation of microprocessor 52 and other power consuming devices associated with data logger 16, is provided by a power supply 58, which provides a predetermined output voltage between terminals 60 and 62, with terminal 62 being connected to ground 64.

Data logger 16 also includes a multiplexer 66 having data input and data output ports 68 and 69, respectively, for communicating with microprocessor 52, receiving a signal TXD from microprocessor 52 at input data port 68, and providing a signal RXD for microprocessor 52 at the data output port 69.

Data logger 16 also has first and second data outputs 70 and 72 for respectively connecting multiplexer 66 with the first and second communication ports 22 and 24, first and second data inputs 71 and 73 for respectively connecting multiplexer 66 with the first and second communication ports 22 and 24, and a select input 74.

The first data output 70, which provides an output signal TXD0 when multiplexer 66 directs data from data input port 68 to the first data output 70, is connected to a first contact 76 of socket connector 23, which is associated with the first communication port 22. The first data input 71 receives a signal RXD0 from a second contact 77 of socket connector 23, which signal is connected to data output port 69 when multiplexer 66 is providing a communication path between microprocessor 52 and the first communication port 22.

While socket connector 23 is illustrated in the Figures as having female contacts, and communications adapter 40 is illustrated as having male contacts, it is to be understood that the coupling arrangement between the first communication port 22 and communications adapter 40 may have any arrangement of male/female contacts, or hermaphroditic contacts, as desired. For purposes of differentiation, the conductive elements of socket connector 23 are called "contacts", while the engaging conductive elements of communications adapter 40 will be called "pins" but either may be male, female, or hermaphroditic.

The second data output 72 provides an output signal TXD1 when multiplexer 66 directs data from data input port 68 to the second data output 72 and thus to the second communication port 24. The second data input 73 receives a signal RXD1 from the second communication port 24, which is connected to data output port 69 when multiplexer 66 is providing a communication path between microprocessor 52 and the second communication port 24.

The select input 74 is connected to a voltage source 78 via a resistor 80, i.e., to the voltage source provided by terminal 60 of power supply 58. Voltage source 78 applies a signal SELON to the select input 74 which is at a logic one level in the absence of active communications between communications adapter 40 and computer 26. The logic one level respectively connects data input and data output ports 68 and 69 to the second data output 72 and the second data input 73 of multiplexer 66, and thus to the second communication port 24. Select input 74 is also connected to a third contact 82 of socket connector 23 from a junction or terminal 86 disposed between resistor 80 and select input 74. Contact 82 functions as a control contact, which controls the state of multiplexer 66. Fourth and fifth contacts 90 and 92 of socket connector 23 are respectively connected to terminals 60 and 62 of power supply 58.

Figure 4:
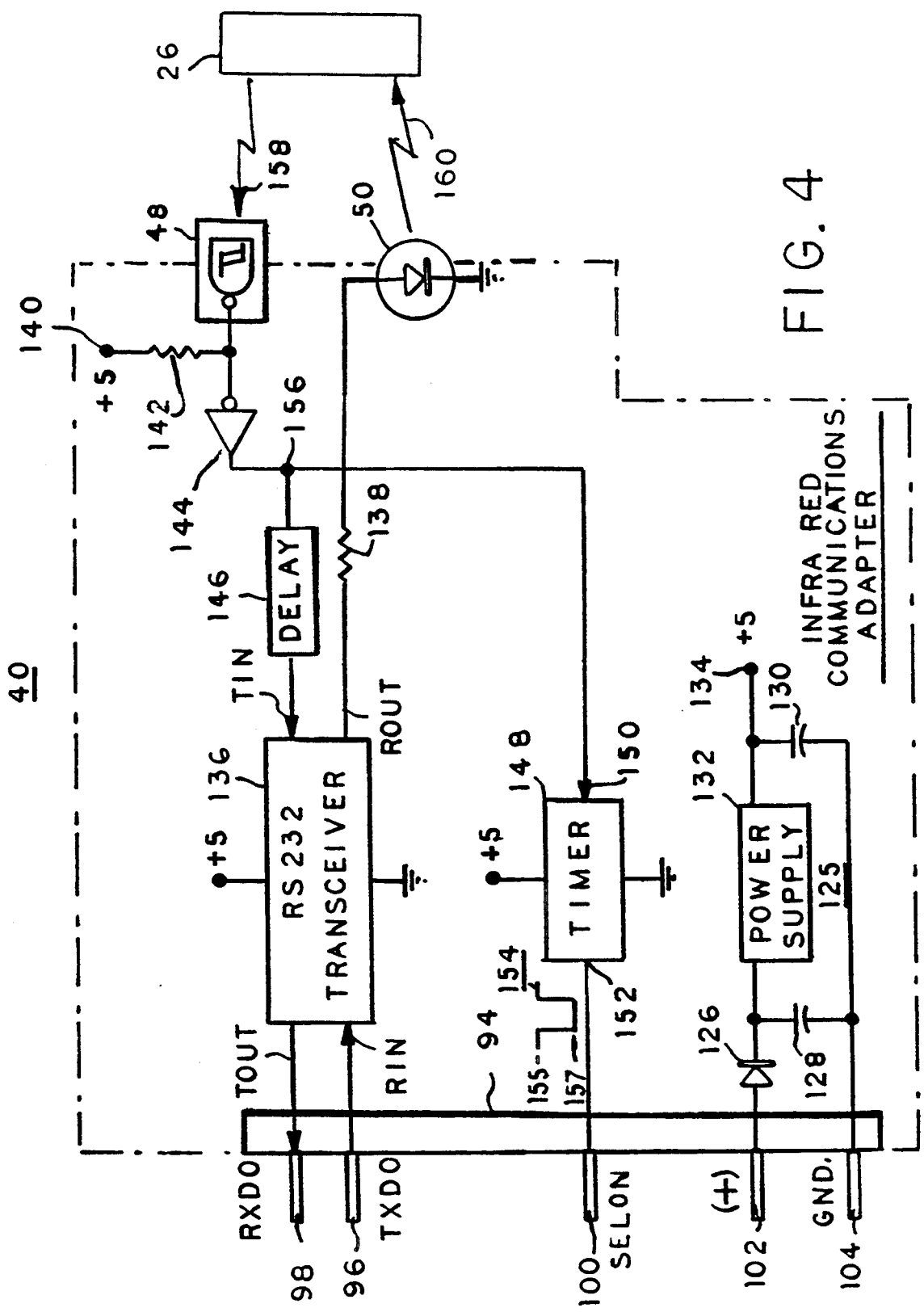
FIG. 4 is a schematic diagram of the communications adapter shown in FIGS. 2 and 3, constructed according to the teachings of the invention.

As illustrated in FIGS. 2 and 4, communications adapter 40 includes a plug connector 94 having first, second, third, fourth and fifth pins 96, 98, 100, 102 and 104, respectively. Pins 96, 98, 100, 102 and 104 are arranged to respectively engage contacts 76, 77, 82, 90 and 92 of socket connector 23 when communications adapter 40 is coupled with the socket connector 23. Thus, contact 76 and pin 96 are associated with a transmit function of multiplexer 66, contact 77 and pin 98 are associated with a receive function, and contact 82 and pin 100 are associated with a control function.

Socket connector 23 has first and second integral ear portions 106 and 108, respectively, having openings 110 and 112 for receiving screws 114 and 116. In like manner, the plug connector portion 94 of communications adapter 40 may have first and second ear portions 118 and 120, respectively, having openings 122 and 124 which are respectively aligned with openings 110 and 112 when plug connector 94 is engaged with socket connector 23. Thus, screws 114 and 116 may be used to snugly maintain the desired coupling or engagement between communications adapter 40 and socket connector 23.

FIG. 4 is a detailed schematic diagram of communications adapter 40. In the exemplary embodiment of the invention, the power levels required for the operation of the power consuming elements of communications adapter 40 are not the same as the voltage output provided by terminals 60 and 62 of power supply 58. Thus, pins 102 and 104 of plug connector 94 are connected to power supply level translating means or apparatus 125 which includes a diode 126, capacitors 128 and 130, a power supply 132, such as National Semiconductor's (NSC) LM2904-5, and an output terminal 134.

In the exemplary embodiment of the invention, the logic levels used in data logger 16 are not compatible with the logic levels of receiver 48 and transmitter 50, and logic level translation means 136 is thus provided, which may be Maxim's MAX232, for example, which is a RS 232 transceiver. The first pin 96 of plug connector 94 is connected to an input RIN, and the second pin 98 is connected to an output TOUT, of logic level translating means 136, hereinafter called transceiver 136. An output ROUT of transceiver 136 is connected to transmitter 50 via a resistor 138. Transmitter 50 may be an infrared light emitting diode (LED), available from Motorola or Hewlett Packard, for example. An input TIN of transceiver 136 is connected to receive incoming communications from receiver 48. Receiver 48 is a photo detector device, preferably a photo Schmitt detector because of the hysteresis, which device is also available from Motorola or Hewlett Packard. The output of receiver 48, hereinafter called photo Schmitt detector 48, is connected to a power supply terminal 140 via a pull-up resistor 142. Since the photo Schmitt detector 48 inverts incoming signals, a logic level inverter 144, such as an inverter gate from NSC's six inverter gate device 74HC04, is connected to the output of photo Schmitt detector 48. An optional line delay circuit 146 is connected between the output of inverter 144 and input TIN of transceiver 136. Line delay circuit 146, for example, may be a line delay circuit constructed of an even number of serially connected logic inverter gates, e.g., two or four, from the hereinbefore mentioned six inverter gate device 74HC04.

Communications adapter 40 also includes timer means 148, such as a 555 timer, or NSC's timer 74HC123, for example. Timer 148 has a trigger input 150 and an output 152. When a logic one signal is applied to the trigger input 150, the timer output 152 provides a signal 154 which is driven from a logic one level 155 to a logic zero level 157 for a predetermined period of time, e.g., for 2 or 3 seconds, as determined by an RC circuit (not shown) associated with timer means 148.

Each new trigger signal applied to trigger input 150 of timer means 148 starts the timing period anew, and thus trigger signals which are closer together than the timing period of timer means 148 will keep output signal 154 low until no trigger signals are received during the last triggered timing period. The trigger input 150 of timer means 148 is connected to the output of inverter 144, at a terminal or junction 156 between inverter 144 and delay circuit 146, and the output 152 of timer 148 is connected to the third pin 100 of plug connector 94.

In the operation of communications adapter 40, an incoming logic one signal from the transmitter 46 of computer 26, indicated by arrow 158, is inverted to a logic zero by photo Schmitt detector 48, and inverted back to a logic one by inverter 144. This logic one signal is applied to the trigger input 150 of timer means 148 and the output signal 154 is driven low. This output signal, which is applied to pin 100, grounds terminal 86 (FIG. 3) at the select input 74 of multiplexer 66, driving signal SELON low. The low signal SELON, which is applied to the select input 74 of multiplexer 66, thus switches multiplexer 66 from providing communications between microprocessor 52 and the second communication port 24, to providing communications between microprocessor 52 and the first communication port 22. Thus, the data input 68 of multiplexer 66 is switched from the second data output 72 to the first data output 70, and the data output 69 is switched from the second data input 73 to the first data input 71. The line delay 146 causes microprocessor 52 to receive the start of a message signal received by photo Schmitt detector 48 after multiplexer 66 has switched outputs. Thus, by the time microprocessor 52 acknowledges receipt of the signal RXD by outputting a signal TXD to the data input 68 of multiplexer 66, multiplexer 66 is already set to direct this signal to the first communication port 22 and to LED or transmitter 50. Transmitter 50 then generates a signal for computer 26 in the infrared range, indicated by arrow 160.

While the line delay 146 is desirable in a preferred embodiment of the invention, it is optional because if microprocessor 52 misses the start of a message, microprocessor 52 will not send an ACK or acknowledge signal back to computer 26, and thus computer 26 will repeat the original transmission. By the time the repeat transmission is sent, multiplexer 66 will have been switched to provide communications via the first communication port 22. Thus, as long as data packets are received by receiver 48, output signal 154 of timer means 148 will be held low, maintaining communications via the first communication port 22.

In summary, communications adapter 40 may be easily and quickly coupled to the socket connector 23 of the first communication port 22 of any data logger 16 which may not be easily accessed by wire-based communications, instantly converting the first communication port 22 from wire-based communications to wireless communications. The same computer 26 will handle either wire-based, or wireless communications, so it is not necessary to utilize two different computers for the two different communication modes. The attachment of the communications adapter 40 to the socket connector 23 of the first communication port 22 has no adverse affect on the ability of data logger 16 to have a default connection to the second communication port 24, as communications adapter 40 automatically gains control at the start of transmission from computer 26, and it retains control only for as long as the communications between computer 26 and data logger 16 are active, automatically returning communications to the second communication port 24 at the conclusion of communications via the first communication port 22.

We claim:

1. A communications adapter for converting a socket connector of communications apparatus from wire-based communication to wireless communication, with the socket connector having transmit and receive contacts, and a control contact which enables the socket connector only when a first predetermined logic level is applied thereto, comprising:

a plug connector, light emitting diode means, timer means, and photo detector means, said plug connector having transmit, receive and control pins arranged to respectively engage the transmit, receive and control contacts of the socket connector, said light emitting diode means being connected to the transmit pin of said plug connector, said timer means having a trigger input and an output, with said timer output being connected to the control pin of said plug connector, said timer means providing a timed output signal at the timer output having said first predetermined logic level in response to a signal applied to the trigger input, and otherwise providing a signal having a second logic level, said photo detector means having an output connected to the trigger input of said timer means and also to the receive pin of said plug connector, wherein an input signal applied to said photo detector means triggers the timer means, enabling communications via the socket connector for the duration of the timed output signal.

2. The communications adapter of claim 1 including logic level translation means, said logic level translation means being connected between the transmit pin of the plug connector and the light emitting diode means, and between the photo detector means and the receive pin of the plug connector.

3. The communications adapter of claim 1 wherein the photo detector means includes photo Schmitt detector means and inverter means, with said inverter means inverting the output of said photo Schmitt detector means.

4. The communications adapter of claim 1 wherein the light emitting diode means emits radiant energy in the infrared portion of the electromagnetic spectrum.

5. The communications adapter of claim 1 including delay means connected between the output of the photo detector means and the receive pin of the plug connector means, whereby the timer means is triggered by an output signal from the photo detector means before the output signal is applied to the receive pin of the plug connector, enabling the socket connector for communications before data is applied to the socket connector by the communications apparatus.

6. The communications adapter of claim 1 wherein the communications apparatus includes power supply means connected to power supply contacts of the socket connector, and wherein the plug connector includes power supply pins which respectively engage the power supply contacts of the socket connector, whereby the communications apparatus provides power for predetermined power consuming devices of the communications adapter.

7. The communications adapter of claim 6 including power level translation means connected between the power supply pins of the plug connector and the predetermined power consuming devices of the communications adapter.

8. A communications adapter for connection to a socket connector associated with a first communication port of data logger means having first and second alternatively selectable communication ports, for converting the socket connector from wire-based communication to wireless communication, with the data logger means having multiplexer means which includes a data input, first and second data outputs respectively connected to a first contact of the socket connector and to the second communication port, a signal input connected to a second contact of the socket connector, and a select input connected to a third contact of the socket connector, with the select input having a default logic level which connects the data input of the multiplexer means to the second data output, comprising:

- a plug connector which includes first, second and third pins which respectively engage the first, second and third contacts of the socket connector,
- light emitting diode means connected to the first pin of the plug connector,
- timer means having an output connected to the third pin of said plug connector, and a trigger input, with said timer means providing a predetermined timed output signal at the timer output in response to a predetermined signal applied to the trigger input,
- and photo detector means having an output connected to the trigger input of said timer means and to the second pin of said plug connector,
- wherein said photo detector means triggers the timer means in response to an input signal applied to the photo detector means, with the timed output signal of said timer means providing a signal for the select input of the multiplexer means which causes the data input of the multiplexer means to be connected to the first data output of the multiplexer means for the duration of the timed output signal.

9. The communications adapter of claim 8 including logic level translation means, said logic level translation means being connected between the first pin of the plug connector and the light emitting diode means, and between the photo detector means and the second pin of the plug connector.

10. The communications adapter of claim 8 wherein the photo detector means includes photo Schmitt detector means and inverter means, with said inverter means inverting the output of said photo Schmitt detector means.

11. The communications adapter of claim 8 wherein the light emitting diode means emits radiant energy in the infrared portion of the electromagnetic spectrum.

12. The communications adapter of claim 8 including delay means connected between the output of the photo detector means and the second pin of the plug connector means, whereby the timer means is triggered by an output signal from the photo detector means before the output signal is applied to the second pin of the plug connector, enabling the data input of the multiplexer means to be connected to the first data output of the multiplexer means before data is applied to the second pin of the plug connector means in response to the signal from the photo detector means.

13. The communications adapter of claim 8 wherein the data logger means includes power supply means connected to fourth and fifth contacts of the socket connector, and wherein the plug connector includes fourth and fifth pins which respectively engage the fourth and fifth contacts of the socket connector, whereby said fourth and fifth pins of the plug connector provide power for predetermined power consuming devices of the communications adapter.

14. The communications adapter of claim 13 including power level translation means connected between the fourth and fifth pins of the plug connector and the predetermined power consuming devices of the communications adapter.

* * * * *